J. OSTERHOUDT.
Method of Opening Tin Cans.
No. 58,554. Patented Oct. 2, 1866.
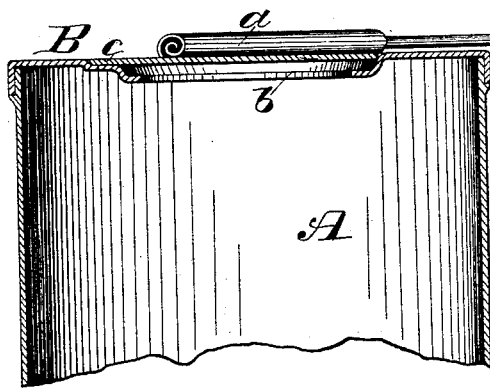
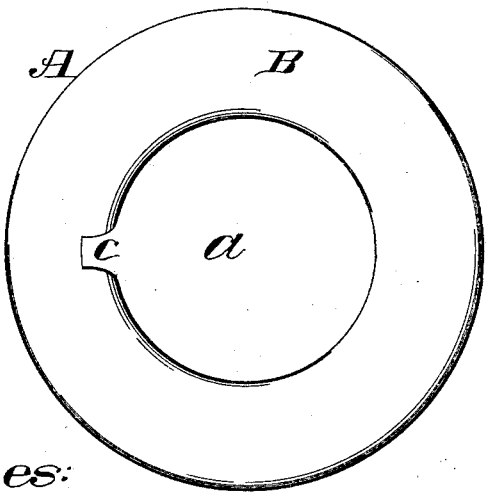
Witnesses:
Inventor:

UNITED STATES PATENT OFFICE.

J. OSTERHOUDT, OF NEW YORK, N. Y., ASSIGNOR TO HIMSELF AND WM. B. DUBOIS, OF THE SAME PLACE.

IMPROVED METHOD OF OPENING TIN CANS.

Specification forming part of Letters Patent No. 58,554, dated October 2, 1866.

*To all whom it may concern:*

Be it known that I, J. OSTERHOUDT, of the city, county, and State of New York, have invented a new and Improved Method of Opening Tin Cans, &c.; and I do hereby declare that the following is a full, clear, and exact description thereof, which will enable those skilled in the art to make and use the same, reference being had to the accompanying drawings, forming part of this specification, in which—

Figure 1 represents a vertical central section of a tin can closed, and also in the act of being opened according to this invention. Fig. 2 is a plan or top view of the same.

Similar letters of reference indicate corresponding parts.

Preserve-cans, paint-boxes, kegs, sardine-boxes, or other vessels made of sheet metal, and intended to be closed hermetically, are generally provided with a round hole in their top, through which they are filled, and which, when the can or box is full, is closed by soldering over it a disk of sheet metal. When the can or box is to be opened this disk has to be removed, and with boxes or cans as now most commonly made, this operation is attended with great difficulty.

The disk, being firmly soldered all round, has to be started by punching a hole through the top of the can or box, and then it can be removed only by cutting round it with proper tools.

The object of this invention is to arrange the disk which closes the box, can, or vessel so that it can be readily removed with an ordinary pair of nippers or pliers; and to this end said disk is provided with a lip projecting from its edge and made solid with the same, in such a manner that, by turning this lip up, a hold is obtained for the nippers or pliers, and the operation of opening the vessel can be effected simply by rolling or turning the disk back gradually until it is separated from the top of the vessel.

A represents a tin can or vessel made of sheet metal, and closed by a disk, $a$, which is soldered over the hole $b$ in the top plate B of the vessel. This top plate may be made flat or with a recess to receive the disk, and the diameter of the disk is somewhat larger than that of the hole, so that its edge is supported all round, and that by soldering it down the vessel is hermetically closed.

In order to facilitate the removal of the disk and the operation of opening the vessel, I provide my disk with a lip, $c$, and in soldering the disk down on the hole $b$ care must be taken to leave this lip free, which is easily effected by turning the same up while the circumference of the disk is soldered. After the disk is secured the lip may be turned down again, as shown in the drawings, and the top plate B may be formed with a recess to receive the lip, and to present a smooth and level surface when closed.

When it is desired to open the vessel, the lip is turned up and taken hold of with a suitable key or a pair of pliers or nippers, and by rolling back, as shown in red in Fig. 1, the seam of the disk is gradually started and the disk is separated from the top plate B in a few seconds.

By making a hole in the lip, or making the lip in the form of a loop, a wire or nail can be introduced, and the use of a key, pliers, or nippers can be dispensed with.

The lip $c$ may be made solid with the disk, and, if desired, two or more such lips may be used; but as a general thing one will be found to be sufficient for all practical purposes.

It does not increase the cost of the vessel, and it does not interfere with closing the same hermetically in the usual manner.

I do not claim the use of a wire soldered between the can and cover to assist opening the can, as described in Letters Patent granted June 28, 1864, to Moritz Primer, as assignee of Jean Bouvet.

My invention is superior to the above in several respects. It admits of more readily and effectually opening the can by rolling the cover back by aid of any instrument which will take even a slight hold of the tag and admit of rolling the corner around it. Bouvet's invention involved the additional cost of the wire, and considerable trouble and inconvenience in applying the wire, and in practice is not always found thoroughly reliable in effecting the opening of the can.

Having thus described my invention, the following is what I claim as new therein and desire to secure by Letters Patent:

1. A device for closing a can or other vessel, consisting of a cover or cap, $a$, to be separated from the said vessel by rolling it upon any suitable instrument by the aid of a tag or lip, $c$, formed in one piece with the cover or cap, and left loose in soldering the latter to the can, as herein explained.

2. In combination with a cover constructed as aforesaid, a recess in the top plate, B, of the can for the reception of the tag $c$, as explained.

J. OSTERHOUDT.

Witnesses:
  W. HAUFF,
  J. P. HALL.